(12) United States Patent
Jung et al.

(10) Patent No.: US 7,210,839 B2
(45) Date of Patent: May 1, 2007

(54) BACKLIGHT SYSTEM AND LIQUID CRYSTAL DISPLAY EMPLOYING THE SAME

(75) Inventors: Il-yong Jung, Suwon-si (KR); Tae-Hee Cho, Seoul (KR); Jong-min Wang, Seongnam-si (KR); Jin-kyoung Oh, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/443,009

(22) Filed: May 31, 2006

(65) Prior Publication Data

US 2006/0268574 A1 Nov. 30, 2006

(30) Foreign Application Priority Data

May 31, 2005 (KR) .................. 10-2005-0046267

(51) Int. Cl.
*F21V 8/00* (2006.01)
(52) U.S. Cl. ................. 362/612; 362/611; 362/613; 362/555
(58) Field of Classification Search ........... 362/611, 362/612, 613, 555, 561
See application file for complete search history.

(56) References Cited

U.S. PATENT DOCUMENTS

2006/0239033 A1* 10/2006 Jung et al. ............... 362/612
2006/0256555 A1* 11/2006 Lengyel et al. ........... 362/231

FOREIGN PATENT DOCUMENTS

| JP | 2004-029141 A | 1/2004 |
| JP | 2004-029370 A | 1/2004 |
| KR | 10-1998-0076384 A | 11/1998 |

* cited by examiner

*Primary Examiner*—Laura K. Tso
(74) *Attorney, Agent, or Firm*—Sughrue Mion, PLLC (57) ABSTRACT

A backlight system providing enhanced uniform brightness and a liquid crystal display (LCD) employing the same are provided. The backlight system includes: a light guide panel which forms a surface light source by guiding light; and a plurality of light emitting units arranged on at least one side of the light guide panel in the form of an array, wherein when the light emitting units in the array are divided into a first region, a second region and a third region and at least one of light emitting units is included in an edge of the first region and an edge of the third region, a quantity of current applied to the first region and the third region is controlled to be larger than a quantity of current applied to the second region in order to control the light guide panel to provide uniform brightness.

16 Claims, 8 Drawing Sheets

BACKLIGHT SYSTEM AND LIQUID CRYSTAL DISPLAY EMPLOYING THE SAME

CROSS-REFERENCE TO RELATED PATENT APPLICATIONS

This application claims priority from Korean Patent Application No. 10-2005-0046267, filed on May 31, 2005, in the Korean Intellectual Property Office, the disclosure of which is incorporated herein in its entirety by reference.

BACKGROUND OF THE INVENTION

1. Field of the Invention

The present invention relates to a backlight system and a liquid crystal display employing the same and, more particularly, to a backlight system providing enhanced uniform brightness, and a liquid crystal display (LCD) employing the same.

2. Description of the Related Art

A liquid crystal display (LCD), which is a type of flat panel display, is a light receiving type display that is not self-luminescent but forms an image using incident light from an outside light source. A backlight system is disposed at a rear of the LCD to irradiate light toward a liquid crystal panel.

According to the arrangement of the light source, the backlight systems are classified into either direct light type backlight systems in which light emitted from a plurality of light sources disposed right below a liquid crystal panel is irradiated toward the liquid crystal panel, or edge light type backlight systems in which light emitted from a light source disposed on a sidewall of a light guide panel is transmitted to a liquid crystal panel.

Figure 1:
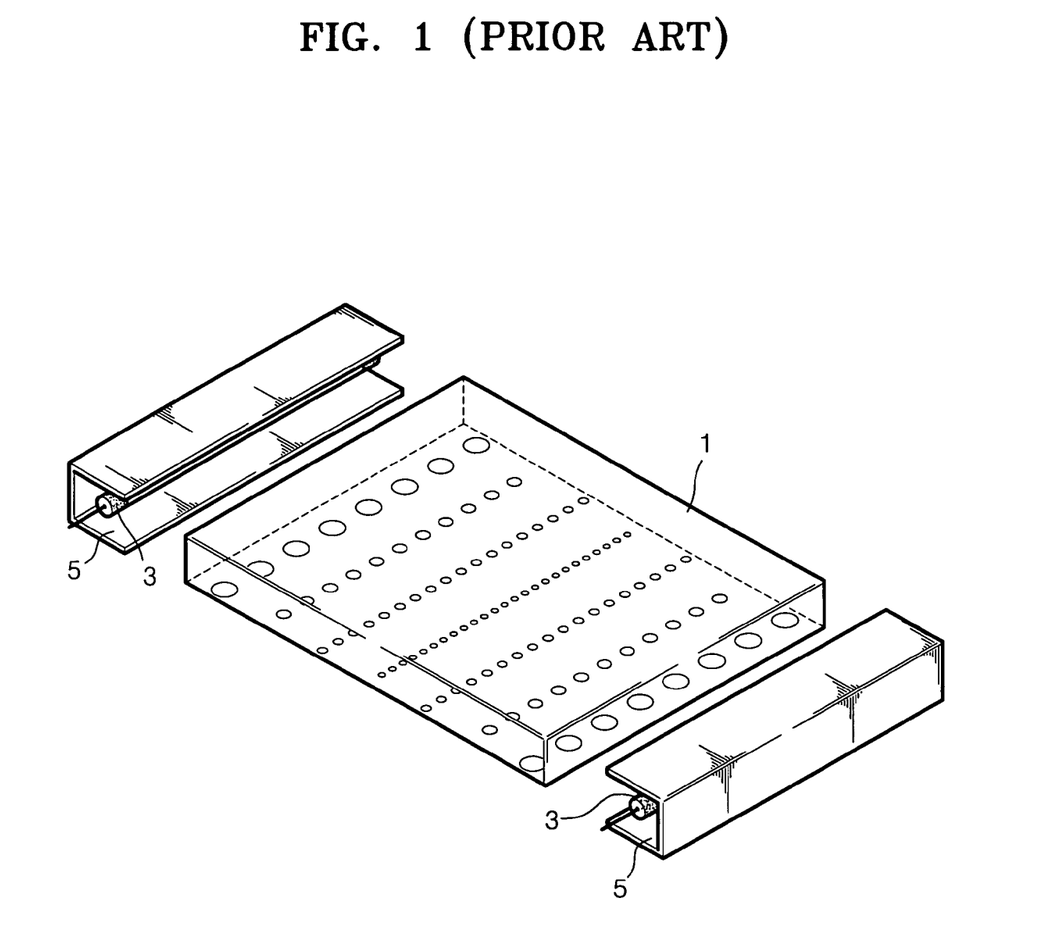
FIG. 1 is a perspective view of a conventional edge light type backlight system.

The edge light type backlight systems using a cold cathode fluorescence lamp (CCFL) have generally been used up to now, and one of the edge light type backlight systems is shown in FIG. 1.

FIG. 1 is a perspective view of a conventional edge light type backlight system.

Referring to FIG. 1, the backlight system includes a light guide panel 1, a plurality of fluorescent lamps 3 arranged at edges of the light guide panel 1, and a plurality of reflectors 5 surrounding each of the fluorescent lamps 3 to reflect light emitted from the fluorescent lamp 3 to the light guide panel 1. The light guide panel 1 propagates the incident light emitted from the fluorescent lamps 3 to form a surface light source. A geometric pattern is printed or formed on a bottom surface of the light guide panel 1 to uniformly diffuse the incident light through the light guide panel 1 for illuminating a liquid crystal panel with uniform brightness.

Since the fluorescent lamps 3 are used in the conventional backlight system, color reproducibility is seriously degraded. In order to overcome such a drawback of the conventional backlight system, there are various studies in progress to develop a backlight system using a light emitting diode (LED) instead of the fluorescence lamp.

However, in the conventional backlight system, dark portions appear in the backlight systems using the fluorescent lamps 3 or the LED because a smaller quantity of light is emitted from the four corners of the backlight system. These dark portions cause the entire uniformity of the backlight system to be degraded.

SUMMARY OF THE INVENTION

The present invention provides an edge light type backlight system with enhanced uniform brightness in which dark portions due to a smaller quantity of light do not appear at corners of a light guide panel, and a liquid crystal display (LCD) employing the same.

According to an aspect of the present invention, there is provided a backlight system including: a light guide panel which forms a surface light source by guiding light; and a plurality of light emitting units arranged on at least one side of the light guide panel in an array, wherein when the light emitting units in the array are divided into a first region, a second region and a third region and at least one of light emitting units is included in an edge of the first region and an edge of the third region, a quantity of current applied to the first region and the third region is controlled to be larger than a quantity of current applied to the second region in order to control the light guide panel to provide uniform brightness.

Approximately the same quantity of current may be applied to the first region and the third region.

Each of the light emitting units may be a multi-chip type light emitting unit which includes a base and a plurality of light emitting chips arranged on the base to emit light of at least two of wavelength ranges.

The light emitting units may further include a cap which mixes light beams emitted from the plurality of light emitting chips by reflection.

The cap may be formed in a cone shape, a poly-pyramid shape, or a dome shape.

The plurality of light emitting chips may be arranged at a circumferential area of the base without arranging the light emitting chips at a center area of the base.

The plurality of light emitting chips may include a first light emitting chip which emits a red light, a second light emitting chip which emits a green light and a third light emitting chip which emits a blue light.

According to another aspect of the present invention, there is provided a liquid crystal display having a liquid crystal panel and a backlight system arranged on a rear surface of the liquid crystal panel and which irradiates light to the liquid crystal panel, wherein the backlight system may include at least one of the above described features.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF ILLUSTRATIVE, NON-LIMITING EMBODIMENTS OF THE INVENTION

An edge light type backlight system according to illustrative, non-limiting embodiments of the present invention and an LCD having the same will now be described more fully with reference to the accompanying drawings, in which exemplary embodiments of the invention are shown.

Figure 2:
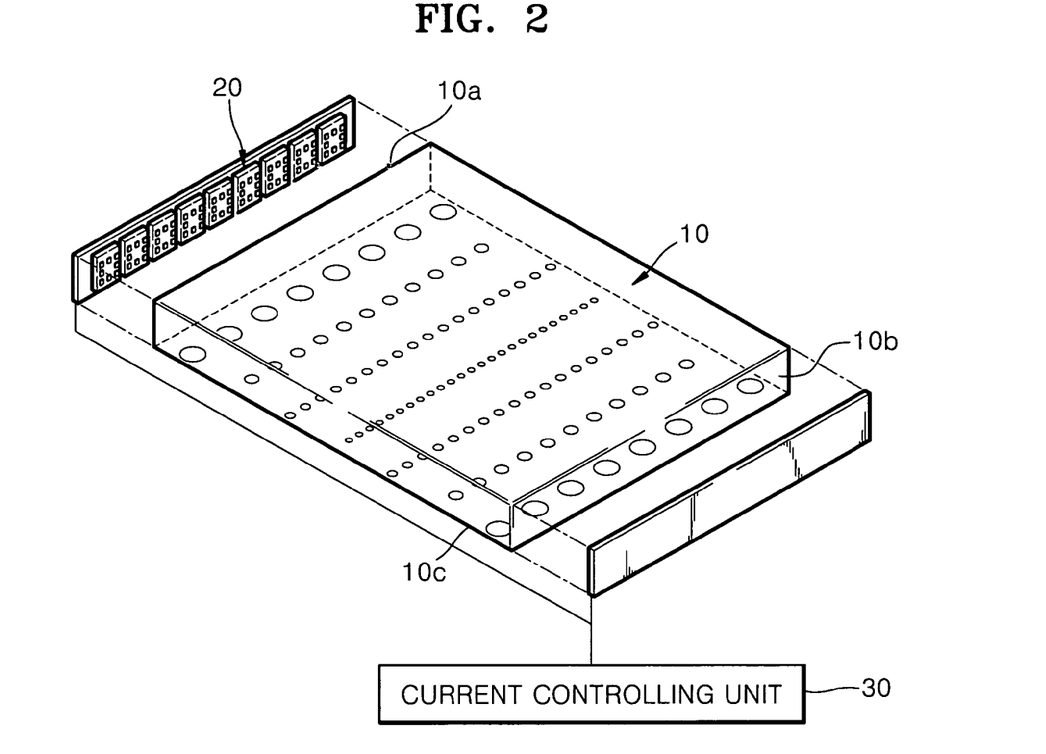
FIG. 2 is a schematic perspective view of an edge light type backlight system according to an exemplary embodiment of the present invention.

FIG. 2 is a schematic perspective view of an edge light type backlight system according to an exemplary embodiment of the present invention.

Referring to FIG. 2, the backlight system according to the present exemplary embodiment includes a light guide panel 10 for guiding incident light, and a plurality of light emitting units 20 arranged on at least one side surface of the light guide panel 10 in the form of an array. In FIG. 2, the light emitting units 20 are arranged on both side surfaces 10a and 10b of the light guide panel 10 to face each other.

The light guide panel 10 propagates light incident from the side surfaces 10a and 10b of the light guide panel 10 to form a surface light source for illuminating a liquid crystal panel with uniform brightness. Geometric patterns may be printed or formed on a bottom surface 10c of the light guide panel 10 to irregularly reflect the incident light. In FIG. 2, the backlight system consistent with the present invention includes the same geometric patterns as shown in FIG. 1. However, the geometric patterns are not limited to these patterns and may be changed in various forms. The backlight system according to the present embodiment may further include a reflector sheet under the light guide panel 10, which will be shown in a backlight system according to another exemplary embodiment of the present invention later on. The reflector sheet reflects the light propagated to a downward direction of the light guide panel 10 to be propagated to an upward direction of the light guide panel 10. The reflector sheet improves the efficiency of using the light in the backlight system.

The light emitting units 20 may be arranged at both side surfaces of the light guide panel 10 in the form of an array. The light irradiated from the light emitting units 20 is propagated through the light guide panel 10 to form a surface light source illuminating a liquid crystal panel arranged on the light guide panel 10.

Figure 3:
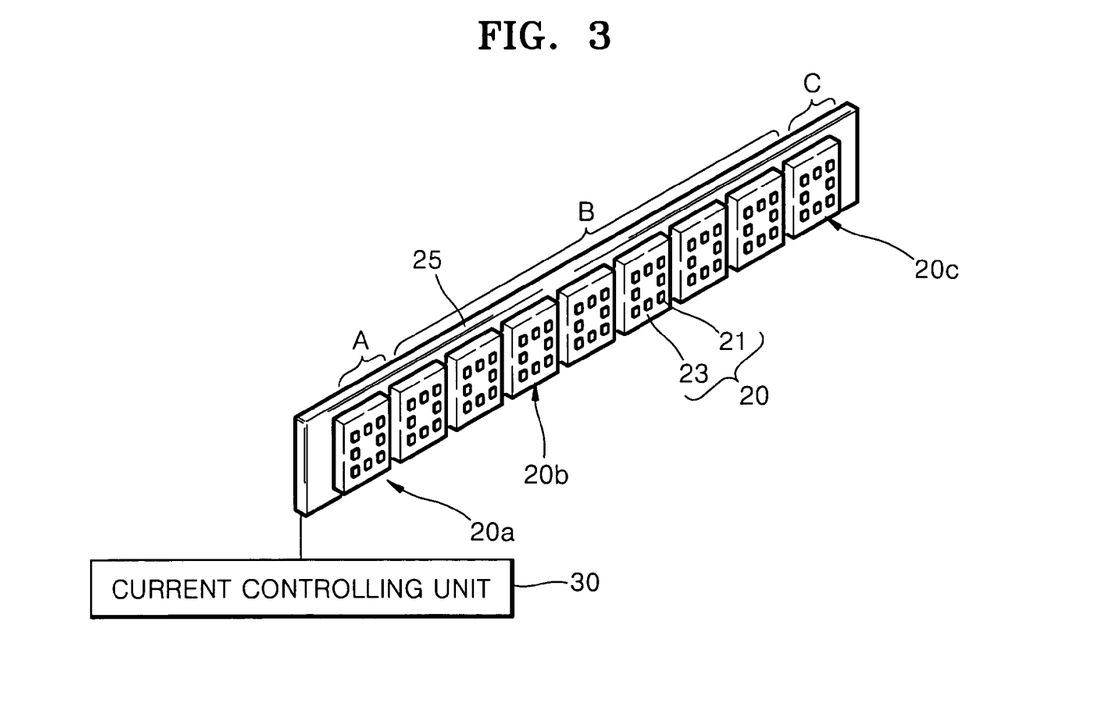
FIG. 3 shows an array of a plurality of light emitting units arranged at both side surfaces of the light guide panel shown in FIG. 2.

FIG. 3 shows an array of a plurality of light emitting units 20 to be arranged at both side surfaces 10a and 10b of the light guide panel 10.

Referring to FIG. 3, the light emitting units 20 are arranged in the form of an array on a substrate 25. In FIG. 3, nine light emitting units 20 are arranged as an array, although the number of light emitting units is not limited to nine.

The substrate 25 may be a printed circuit board designed for the plurality of light emitting units 20. For example, the substrate 25 may be a metal core printed circuit board (MCPCB) having superior heat conductivity. It is preferable, but not necessary, that the backlight system according to the present embodiment may further include a heat radiation device (not shown), for example, a heat sink (not shown) such as a heat radiation fin, a cooling fan and/or a heat pipe for dissipating heat generated from the light emitting units 20. If the MCPCB is used as the substrate 25, the heat may be more effectively transferred to the heat radiation device.

Each of the light emitting units 20 is a multi-chip light emitting unit including a base 23 and a plurality of light emitting chips 21 arranged on the base 23 and which emit light of at least two wavelength ranges.

For example, each of the light emitting units 20 may include at least one of a first light emitting chip which emits a red light (R), at least one of a second light emitting chip which emits a green light (G) and at least one of a third light emitting chip which emits a blue light (B).

Figure 4:
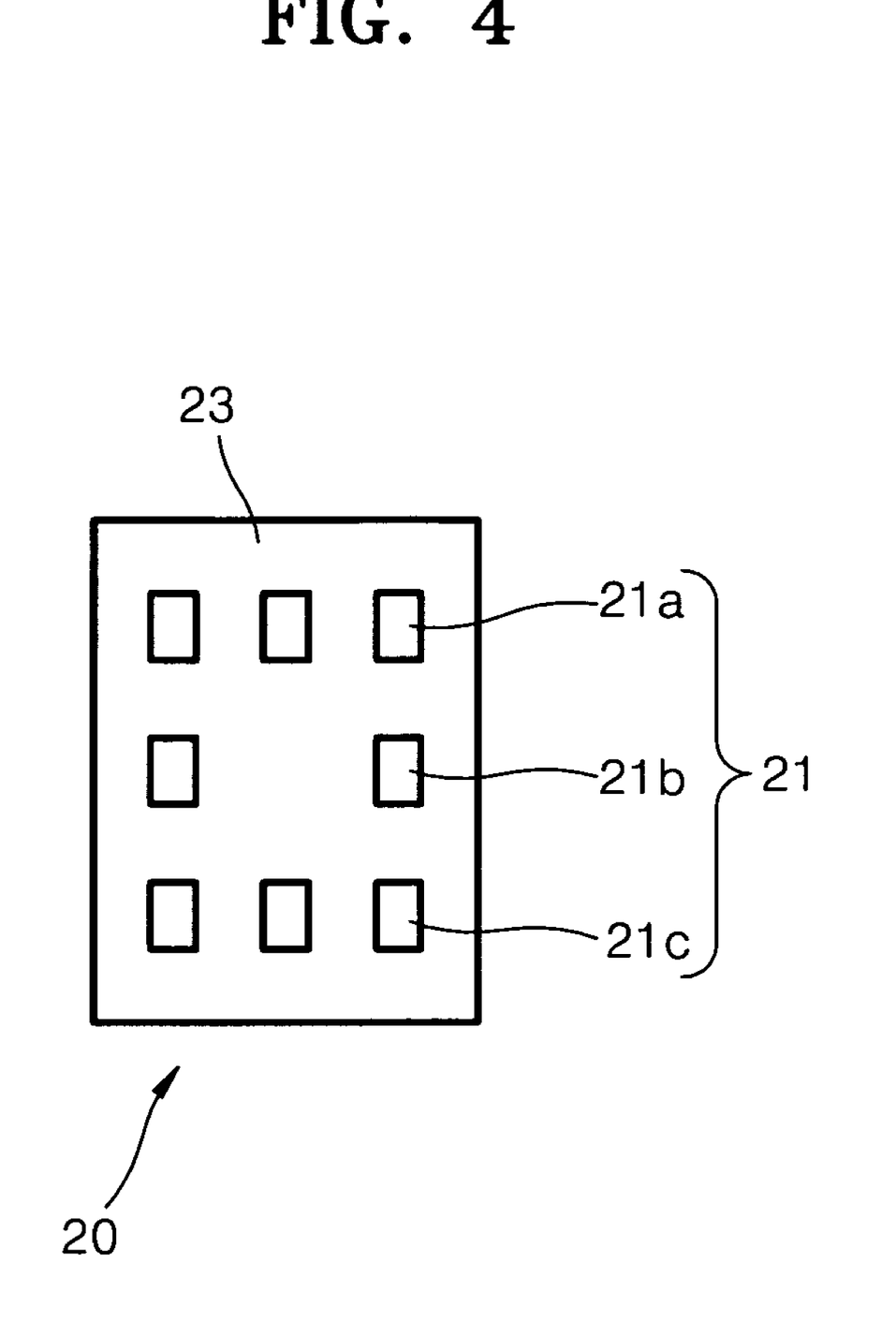
FIG. 4 shows an enlarged view of light emitting units shown in FIG. 3.

FIG. 4 is an enlarged view of one of the light emitting units 20 shown in FIG. 3.

Referring to FIG. 4, each of the light emitting units 20 includes three of the first light emitting chips 21a, two of the second light emitting chips 21b and three of the third light emitting chips 21c.

The number of light emitting chips 21 per each wavelength range and the arrangement of the light emitting chips 21 may vary according to a desired color and temperature range by considering a quantity of light emitted from the light emitting chips 21 of each wavelength range. Since the light emitting unit 20 can be set by various configurations of the arrangement of the light emitting chips 21 which emit a range of light having a plurality of wavelengths and the number of the arranged light emitting chips 21, there are advantages in color realization and color selectivity of a manufacturer. Although the light emitting unit 20 is configured to have a multi-chip structure, the size of the light emitting unit 20 does not significantly increase compared to a light emitting unit having a single chip and thus, there is no concern about an increase in volume.

The backlight system consistent with the present invention may further include a current controlling unit 30 for improving the brightness at the four corners by selectively controlling a quantity of current applied to the light emitting unit 20.

In order to selectively control the quantity of current, it is assumed that the array of the plurality of light emitting units 20 may be divided into a first region A, a second region B, and a third region C, and the first region A and the third region C include at least one of light emitting units 20a and 20c at an outer portion of each region. In this case, the current controlling unit 30 controls the quantity of current applied to the light emitting units 20a and 20c in the first region A and the third region C to be larger than a quantity of current applied to the light emitting unit 20b in the second region B. The quantity of current applied to the light emitting units 20a and 20c included in the first region A and the third region C may be approximately identical.

When the current controlling unit 30 operates to apply larger quantity of current to the light emitting units 20a and 20c arranged at both edges of the array of the light emitting unit 20 than the current applied to the light emitting unit 20b arranged at a middle portion of the array as described above, a larger quantity of light would be emitted from the four corners of the backlight system compared to applying an identical quantity of current to all of the light emitting units. Accordingly, a dark edge problem, which is caused by a smaller quantity of light being emitted from corners of the conventional backlight system, can be prevented and the entire brightness uniformity can be also improved.

A brightness uniformity of a backlight system is a factor used to evaluate a surface light source. Generally, a brightness uniformity of an edge light type backlight system is low because a comparatively low brightness at the four corners causes the entire brightness uniformity of the backlight system to degrade. However, the quantity of light emitted from the four corners of the backlight system consistent with the present invention is controlled to be larger than the quantity of light emitted from other regions of the backlight system. Therefore, the brightness uniformity is improved and darker regions of the backlight system are eliminated.

Hereinafter, a dark portion improving effect by controlling the quantity of current applied to light emitting units arranged at the edges of the array of the light emitting units 20 to be larger than the quantity of current applied to the light emitting units 20 arranged at the middle portion of the array will be explained in detail.

Figure 5A:
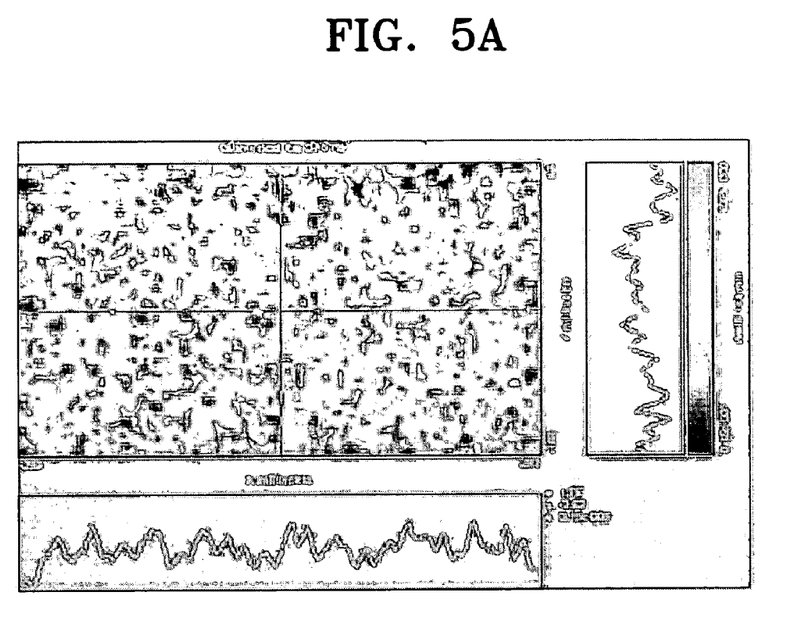
FIG. 5A shows an optical simulation result obtained by applying identical quantity of current to all of light emitting units arranged at both side surfaces of a light guide panel.
Figure 5B:
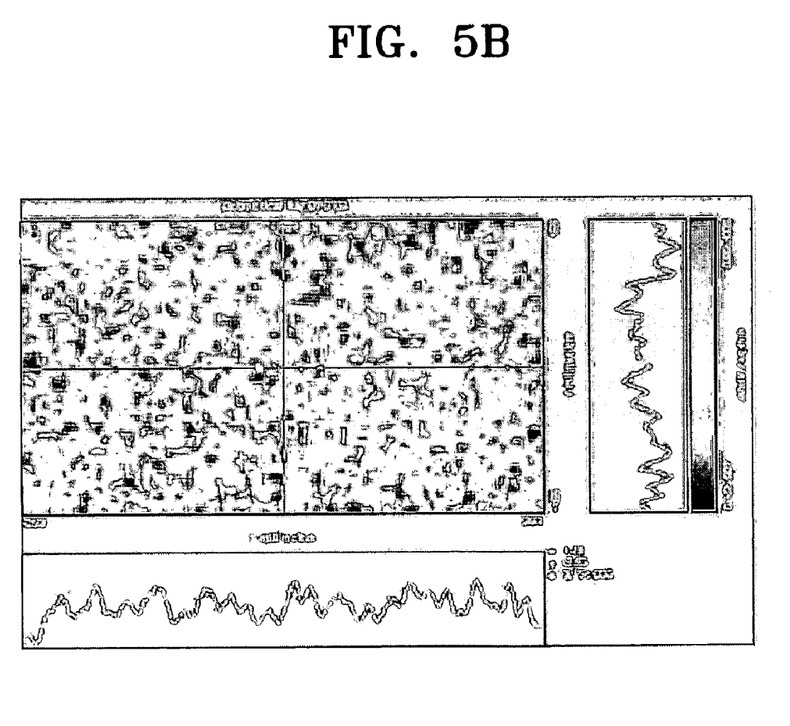
FIG. 5B shows an optical simulation result obtained by applying a larger quantity of current to light emitting units arranged at both edges than the quantity of current applied to light emitting units arranged at a middle portion.

FIG. 5A shows an optical simulation result obtained by applying an identical quantity of current to all of light emitting units 20 arranged at both side surfaces of the light guide panel 10, and FIG. 5B shows an optical simulation result obtained by applying a larger quantity of current to light emitting units 20a and 20c arranged at both edges than light emitting units 20b arranged at a middle portion. The arrays of light emitting units 20 are arranged on upper and bottom sides of the pictures shown in FIGS. 5A and 5B.

The optical simulation results shown in FIGS. 5A and 5B are obtained by arranging 23 multi-chip type light emitting units 20 at both side surfaces of the light guide panel 10 to emit white light. That is, the optical simulation result shown in FIG. 5A is obtained by applying an identical quantity of basic current $I_{basic}$ to all of the 23 light emitting units 20, and the optical simulation result shown in FIG. 5B is obtained by an applying identical quantity of basic current $I_{basic}$ to 21 light emitting units 20b arranged on a middle portion of the side surface, which is the second region B, and applying a 10% larger quantity of current to one light emitting unit 20a and one light emitting unit 20c arranged at both edges of the side surface, which are the first region A and the third region C, than the quantity of the basic current $I_{basic}$.

As shown in FIGS. 5A and 5B, four corners of the backlight system in FIG. 5B have improved brightness compared to FIG. 5A. That is, when the quantity of current applied to the light emitting units 20 is controlled like in the present invention, the four corners of the backlight system become brighter compared to the case of brightness obtained by applying an identical quantity of current to all of the light emitting units 20 using a conventional method.

Figure 6:
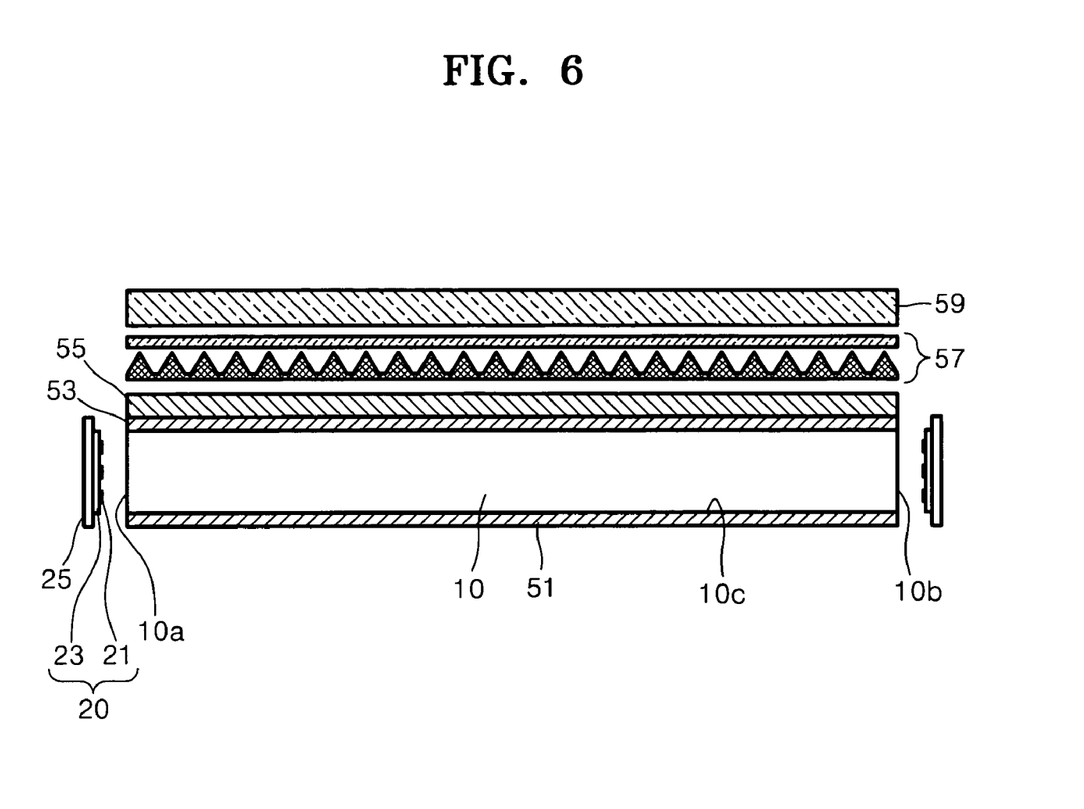
FIG. 6 is a schematic cross-sectional view of a backlight system according to another exemplary embodiment of the present invention.

FIG. 6 is a schematic cross-sectional view of a backlight system according to another embodiment of the present invention.

As shown in FIG. 6, the backlight system according to another exemplary embodiment has an identical configuration with the backlight system shown in FIG. 2 and further includes at least one of a reflector sheet 51, a diffusion sheet 53, a prism sheet 55, a brightness enhancement film 57 and a polarization enhancement film 59. FIG. 6 shows an example wherein the backlight system further includes all of the above, i.e., the reflector sheet 51, the diffusion sheet 53, the prism sheet 55, the brightness enhancement film 57 and the polarization enhancement film 59.

The reflector sheet 51 may be arranged on a bottom surface 10c of the light guide panel 10. The diffusion sheet 53 may be arranged on the light guide panel 10. The light emitted toward an upward direction from the light guide panel 10 is diffused by the diffusion sheet 53. The prism sheet 55 is arranged on the diffusion sheet 53 to correct a path of light.

The brightness enhancement film 57 is arranged on the prism sheet 55 to enhance directivity of light. That is, the brightness enhancement film 57 refracts and condenses the light emitted from the light guide panel 10 to increase the directivity. Accordingly, the brightness enhancement film 57 enhances the brightness.

The polarization enhancement film 59 improves polarization efficiency. The polarization enhancement film 59 maximizes the incident light to be emitted as light polarized in one direction, that is, p-polarization, by passing light of P-polarization and reflecting light of S-polarization. Hereinafter, various exemplary embodiments of the light emitting unit 20 that can be applied to a backlight system according to the present invention will be described.

The light emitting unit 20 having the base 23 and the plurality of light emitting chips 21 arranged on the base 23 without a cap is shown in FIGS. 2 through 4. Alternatively, the backlight system consistent with the present invention may include a light emitting unit 20 further having various types of caps 27 as described below.

Figure 7A:
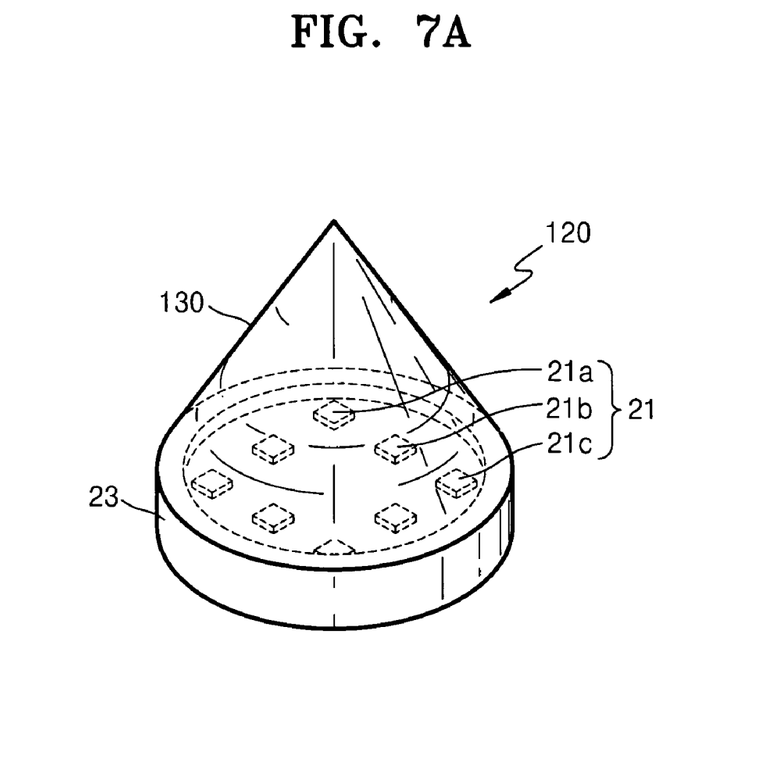
FIGS. 7A and 7B show an example of a light emitting unit that can be used in a backlight system consistent with the present invention.
Figure 7B:
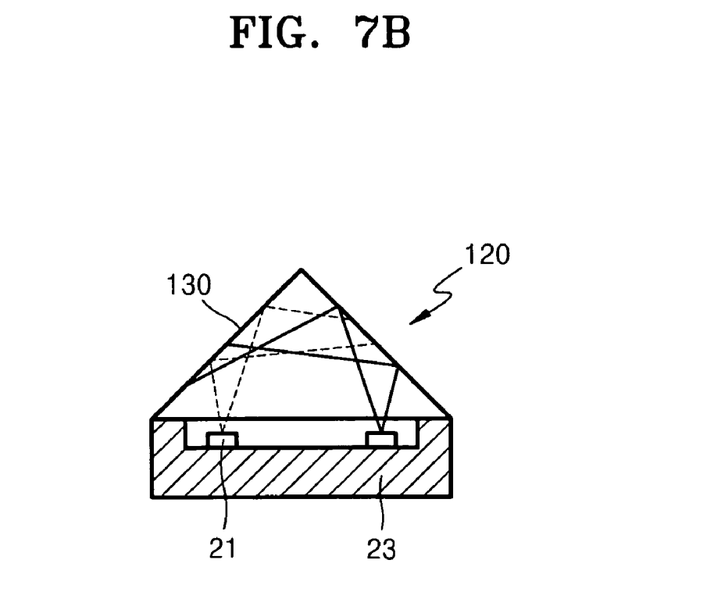

FIGS. 7A and 7B show another example of a light emitting unit 120 that can be used in a backlight system consistent with the present invention.

Referring to FIGS. 7A and 7B, the light emitting unit 120 (which is shown having a circular shape but is not limited thereto) may further include a cap 130 with the light emitting unit 20 shown in FIGS. 2 through 4. Like numeral references denote like elements in FIGS. 2 through 4 and FIGS. 7A and 7B.

Light beams emitted from the plurality of light emitting chips 21 are repeatedly reflected by the cap 130, thereby being mixed one another inside the cap 130. The cap 130 is formed of a transparent material. For example, the cap 130 may be formed as a lens.

The cap 130 is formed of a material having a refractive index higher than a medium between the light emitting unit 120 and the light guide panel 10 in order to satisfy a total internal reflection condition. For example, when the medium between the light emitting unit 120 and the light guide panel 10 is an air, the cap 130 may be formed of epoxy resin or polymetal Methacrylate (PMMA), which both have a refractive index of 1.49. Since the cap 130 has a refractive index larger than the air, the cap 130 totally reflects the light incident with an angle larger than a critical angle at a boundary surface several times. Accordingly, beams having different wavelength ranges emitted from the light emitting chips 21 are mixed inside the cap 130. As a result, the white light is emitted from the light emitting unit 120.

The cap 130 may be formed as various shapes such as a circular cone, a dome or a poly-pyramid. In FIGS. 7A and 7B, the circular cone shape of the cap 130 is shown.

It is preferable, but not necessary, that the light emitting chips 21 are arranged at circumferential regions of the base 23. That is, the light emitting chips 21 are not arranged at a center of the base 23 to prevent generation of a brighter spot.

The brighter spot is a spot shown brighter than any other area since the light emitted from the light emitting chip 21 is not uniformly diffused. Such a brighter spot is a factor degrading an image quality.

If the light emitting chips 21 are arranged on the center of the base 23, light beams emitted from the light emitting chips are mostly incident to a vertex of the cap 130 and the light beams are mostly passed through the cap 130 without being totally reflected by the cap 130. That is, if the light emitting chips 21 are arranged on a center of the base 23 at which a center of the cap faces, light beams emitted from the light emitting chips mostly are incident to the cap 130 with an angle smaller than a critical angle of the cap 130. Therefore, the lights are mostly passed straight through the cap 130 or passed through the cap 130 by being refracted. On the contrary, if the light emitting chips 21 are arranged on circumferential areas of the base 23, the light emitted from the light emitting chips 21 is totally reflected by the cap 130 since the light is incident to the cap 130 with an angle larger than the critical angle of the cap 130.

Figure 8:
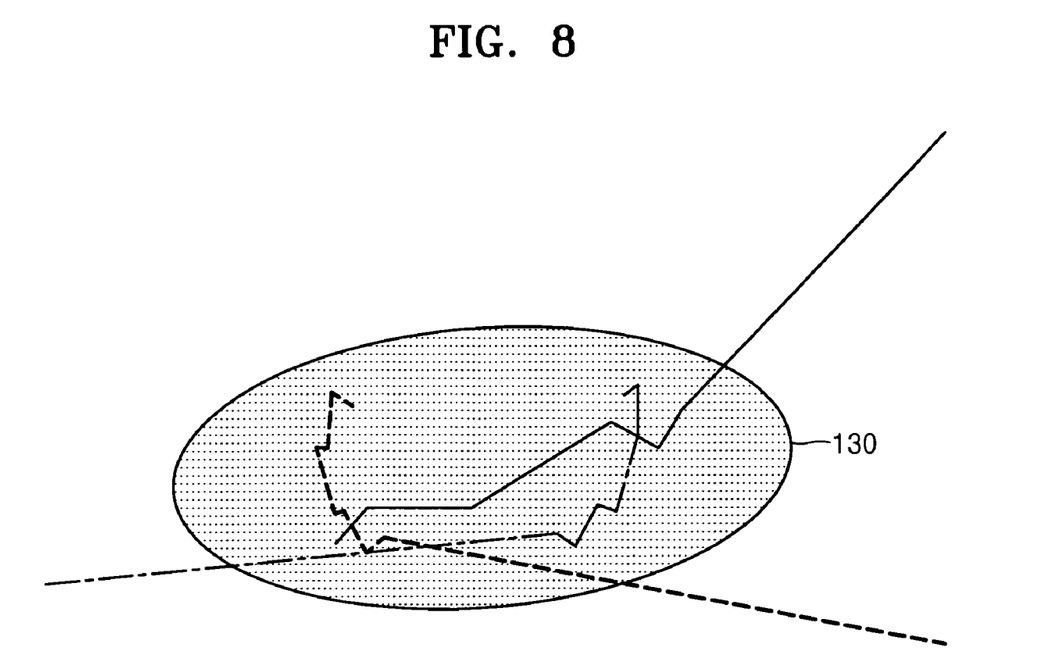
FIG. 8 is a view showing a ray tracing of light on the surface of a circular cone-shaped cap.

FIG. 8 is a view showing a ray tracing of light on the surface of a circular cone-shaped cap.

As shown in FIG. 8, the light is propagated to an outside of the cap 130 after being total-reflected in several times on a surface of the cap 130.

As described above, when the light emitting unit 120 includes a plurality of light emitting chips 21 emitting light having a plurality of wavelength ranges and the cap 130, the light emitting unit 120 outputs white light by totally reflecting the light emitted from the light emitting chips 21 to be mixed.

Figure 9:
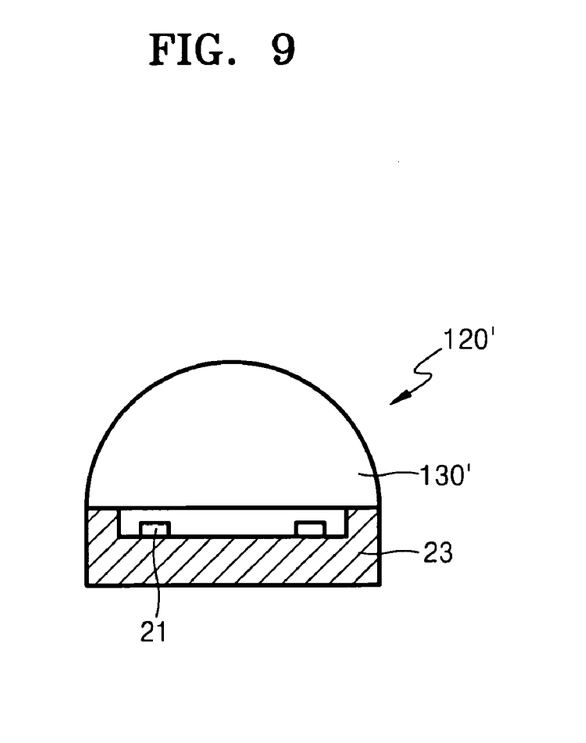
FIGS. 9 and 10 show other examples of a light emitting unit can be used in a backlight system consistent with the present invention.

Meanwhile, a light emitting unit 120' may include a dome-shaped cap 130' as shown in FIG. 9. The dome shape cap 130' may be formed as a lens.

The lights emitted from the light emitting chips 21 and having different wavelengths are totally reflected in the cap 130' several times and then externally emitted to an outside of the cap 130'.

Figure 10:
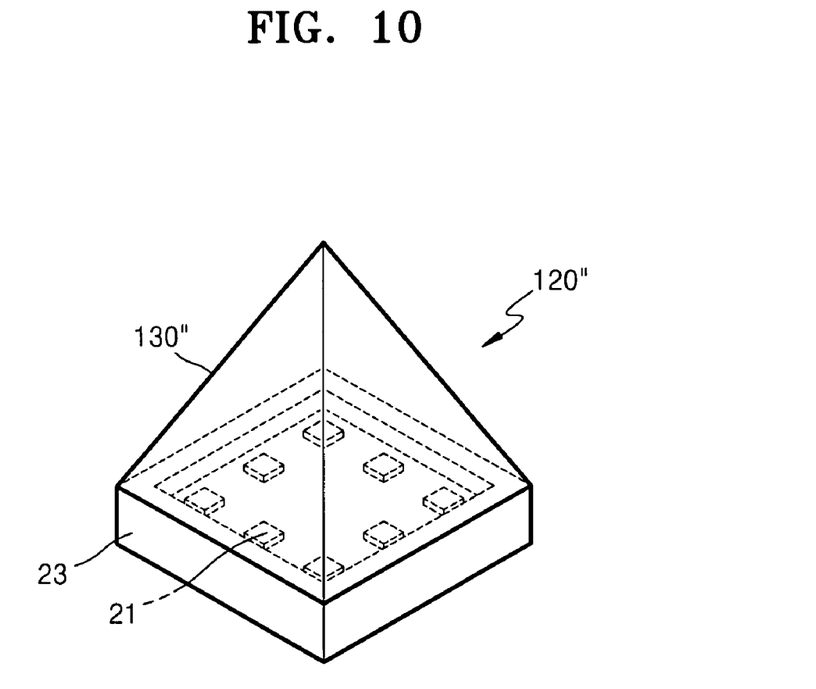

Referring to FIG. 10, the light emitting unit 120" may include a poly-pyramid-shaped cap, for example, a square pyramid-shaped cap 130" instead of the circular cone-shaped or the dome-shaped caps as in other embodiments of the present invention.

As described above, the light emitting unit for the backlight system according to the present invention may include various shapes of the cap shown in FIGS. 7A through 10.

The light emitting units 20, 120, 120' and 120" are described to include a plurality of light emitting chips which emit lights of a plurality of wavelength ranges. However, the light emitting units 20, 120, 120' and 120" may include one or more light emitting chips which emit white light.

Furthermore, the light emitting units 20, 120, 120' and 120" may include a single light emitting chip emitting light of a predetermined wavelength range. When the single light emitting chip is used, the plurality of light emitting units 20, 120, 120' and 120" is arranged on a side surface of the light guide panel 10 to emit white light by alternately arranging three types of light emitting units each of which emits a red light, a green light and a blue light.

Figure 11:
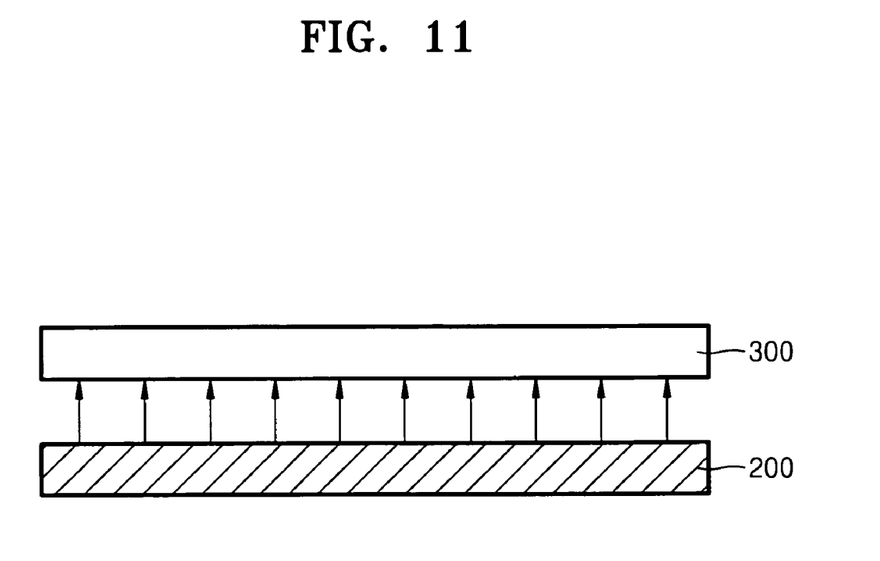
FIG. 11 schematically shows a structure of a liquid crystal display (LCD) having a backlight system consistent with the present invention.

FIG. 11 schematically shows a structure of a liquid crystal display (LCD) having a backlight system consistent with the present invention.

Referring to FIG. 11, the liquid crystal display (LCD) includes a liquid crystal panel 300 and a backlight system 200 arranged on a rear surface of the liquid crystal panel 300. The backlight system 200 is the backlight system according to the present invention shown in FIGS. 2 through 4, and FIGS. 7A through 10.

The liquid crystal panel 300 displays image information by polarization variation of light passed through a liquid crystal layer. That is, the liquid crystal panel 300 irradiates light linearly polarized in one direction to a liquid crystal layer and generates an electric field to change a direction of a liquid crystal director to display image information. Any type of a liquid crystal panel can be used as the liquid crystal panel 300. Since various structures of the liquid crystal panel 300 are well-known to those skilled in the art, detailed description and drawings thereof are omitted.

As described above, in the backlight system and the light crystal display employing the same, a larger quantity of current is applied to light emitting units arranged at edges of a light guide panel than the quantity of current applied to light emitting units arranged at a middle portion of side surfaces of the light guide panel in the present invention, so that a larger quantity of light can be emitted. Accordingly, the backlight system consistent with the present invention does not have comparatively darker portions on corners, which are caused by a lack of light quantity. Therefore, the entire brightness uniformity is improved according to the present invention.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A backlight system comprising:
   a light guide panel which forms a surface light source by guiding light; and
   a plurality of light emitting units arranged on at least one side of the light guide panel in an array,
   wherein when the light emitting units in the array are divided into a first region, a second region and a third region and at least one of light emitting units is included in an edge of the first region and an edge of the third region, a quantity of current applied to the first region and the third region is controlled to be larger than a quantity of current applied to the second region in order to control the light guide panel to provide uniform brightness.

2. The backlight system of claim 1, wherein approximately the same quantity of current is applied to the first region and the third region.

3. The backlight system of claim 1, wherein each of the light emitting units is a multi-chip type light emitting unit including a base and a plurality of light emitting chips arranged on the base to emit light of at least two of wavelength ranges.

4. The backlight system of claim 3, wherein each of the light emitting units further comprises a cap which mixes light beams emitted from the plurality of light emitting chips by reflection.

5. The backlight system of claim 4, wherein the cap is formed in one of a cone shape, a poly-pyramid shape, and a dome shape.

6. The backlight system of claim 3, wherein the plurality of light emitting chips are arranged at a circumferential area of the base without arranging the light emitting chips at a center area of the base.

7. The backlight system of claim 3, wherein the plurality of light emitting chips include a first light emitting chip which emits a red light, a second light emitting chip which emits a green light and a third light emitting chip which emits a blue light.

8. A liquid crystal display having a liquid crystal panel and a backlight system arranged on a rear surface of the liquid crystal panel and which irradiates light to the liquid crystal panel, wherein the backlight system comprises:
a light guide panel which forms a surface light source by guiding light; and
a plurality of light emitting units arranged on at least one side of the light guide panel in an array,
wherein when the light emitting units in the array are divided into a first region, a second region and a third region and at least one of light emitting units is included in an edge of the first region and an edge of the third region, a quantity of current applied to the first region and the third region is controlled to be larger than a quantity of current applied to the second region in order to control the light guide panel to provide uniform brightness.

9. The liquid crystal display of claim 8, wherein approximately the same quantity of current is applied to the first region and the third region.

10. The liquid crystal display of claim 8, wherein each of the light emitting units is a multi-chip type light emitting unit including a base and a plurality of light emitting chips arranged on the base to emit light of at least two of wavelength ranges.

11. The liquid crystal display of claim 10, wherein each of the light emitting units further comprises a cap which mixes light beams emitted from the plurality of light emitting chips by reflection.

12. The liquid crystal display of claim 11, wherein the cap is formed in one of a cone shape, a poly-pyramid shape, and a dome shape.

13. The liquid crystal display of claim 10, wherein the light emitting chips are arranged at a circumferential area of the base without arranging the light emitting chips at a center area of the base.

14. The liquid crystal display of claim 10, wherein the plurality of light emitting chips include a first light emitting chip which emits a red light, a second light emitting chip which emits a green light and a third light emitting chip which emits a blue light.

15. The backlight system of claim 7, wherein each of the light emitting units comprises three of the first light emitting chips, two of the second light emitting chips and three of the third light emitting chips.

16. The liquid crystal display of claim 14, wherein each of the light emitting units comprises three of the first light emitting chips, two of the second light emitting chips and three of the third light emitting chips.

* * * * *